United States Patent Office 2,757,106
Patented July 31, 1956

2,757,106
COATED PAPER PRODUCTS AND METHOD OF MAKING

George L. Brown, Moorestown, N. J., and Benjamin B. Kine, Levittown, Pa., assignors to Rohm & Haas Company, Philadelphia, Pa., a corporation of Delaware No Drawing. Application May 28, 1953, Serial No. 358,169

20 Claims. (Cl. 117—155)

This invention relates to coated paper products, especially to paper products which are employed for the packaging of greasy or oily materials. More particularly, it relates to food wrappers which are grease-proof. Specifically it relates to an improved process for the preparation of coated paper products which are grease-proof and which can be rolled or stacked without danger of blocking and which retain their grease-proofness when they are folded.

An object of this invention is to provide a coating for paper products, such as bags, boxes and wrappings, which prevent the penetration of oils, fats or greases into the paper product. Another object is to provide a coating which prevents such penetration even after the coated paper product is folded. Another object is to provide a coating which is laid down in the form of a dispersion but which is nevertheless susbtantially continuous on being dried. Still another object is to provide a coating which, although it is resinous, does not cause sticking or blocking of the coated products when they are in contact with one another as in a pile, stack, roll or bundle.

These and other objects are accomplished by coating a paper product with a particular kind of resin dispersion, which is described in detail below, and thereafter removing substantially all of the water from the applied coating whereby it dries to a grease-proof, extensible and non-blocking film.

The aqueous dispersions which are employed in this invention contain copolymers of (a) the lower alkyl esters of acrylic and methacrylic acids and (b) acrylic, methacrylic and/or itaconic acids, which copolymers are cross-linked by means of certain polyvalent metals. They are made by emulsifying and copolymerizing—preferably under the influence of a peroxidic or free-radical catalyst—a mixture which contains at least one of each of the two kinds of polymerizable materials mentioned above, and then neutralizing at least some of the free carboxyl groups in the copolymer by means of an oxide, hydroxide, or salt of a polyvalent metal, according to the disclosure of our application for Letters Patent, Serial No. 336,632 filed February 12, 1953, and now abandoned.

The coating materials are to all intents and purposes dispersions of cross-linked resins because pairs of carboxyl groups in the various molecular chains are joined together; i. e., are cross-linked, by the atoms of the polyvalent metals. As long as a substantial amount of water is present, ionization occurs and the positive ions of the cross-linker and the negative ions of the resin have a certain degree of mobility so that the cross-linkages are not fixed or rigid. As a result, the resin particles in a film of resin can and do coalesce as drying takes place. However, as the water is removed by evaporation or force-drying, the mobility of the ions is gradually reduced; and when 70% or preferably more of the water is removed, the ions become immobilized. Then the metals and the long chains of resin become chemically bound in a rigid, fixed, tackfree and cross-linked molecular configuration.

The dispersions used in this invention are in reality those of ionically cross-linked resins and they are decidedly different from and are not to be confused with the dispersions of resins which are cross-linked by means of a polyvinyl compound such as divinyl benzene. The latter kind of dispersions contains resins which are rigidly cross-linked even when they are dispersed in the aqueous phase and consequently on drying they deposit the resin in the form of discrete particles which do not effectively coalesce and which form porous or discontinuous films. Furthermore, the dispersions employed in this invention give rise to films which are not subject to cold-flow and which do not block in contrast to dispersions of the same esters and acids which are not ionically cross-linked.

The dispersions are prepared by emulsifying at a temperature from 0° C. to 100° C.—and preferably from 10° C. to 60° C.—a mixture of (a) one or more monomeric esters of acrylic and/or methacrylic acid and (b) monomeric acrylic, methacrylic or itaconic acid or mixtures of these acids in water and polymerizing the mixture while it is in the emulsified form. It is recommended that a nonionic or dispersing agent be used, many of which, such as the p-alkyl-phenoxypolyethoxyethanols, are well known and are commercially available. The monomeric esters of acrylic and methacrylic acids which have proven to be most satisfactory are the alkyl esters in which the alkyl group contains one to four carbon atoms and which embrace the following: methyl, ethyl, n-propyl, isopropyl, n-butyl, isobutyl, sec.-butyl, and tert. butyl acrylates and methacrylates. From 3% to 7% on a molar basis—or preferably from 4% to 6%—of the acid is employed.

Peroxidic free-radical catalysts, particularly catalytic systems of the redox type, are recommended such as a combination of potassium persulfate and sodium metabisulfite. Other suitable peroxidic agents include the "per-salts" such as the alkali metal and ammonium persulfates and perborates, hydrogen peroxide, organic hydroperoxides such as tert.-butyl hydroperoxide and cumene hydroperoxide, and esters such as tert.-butyl perbenzoate. In this way, it is possible to prepare dispersions which contain as much as 60%, or even more, of the resinous copolymer on a weight basis.

Next, free carboxyl groups of the dispersed copolymer are neutralized; and this is done by adding a basic compound of a polyvalent metal which forms salts with the carboxyl groups of the copolymer. Oxides or hydroxides of the following polyvalent metals have produced dispersions which deposited films of outstanding properties: aluminum, barium, calcium, copper, lead, iron, nickel, cobalt, magnesium, strontium, zinc, titanium, and zirconium. It must also be pointed out that the basic salts of these metals and their salts of weak acids have been used successfully, such as basic aluminum acetate and formate; basic zirconium acetate, chloride, and formate; magnesium and lead acetates; basic titanium chloride; and the like. It has been found that the acid groups of the copolymers must be converted to salt groups to such an extent that at least 3% and preferably 4% or more, on a molar basis, of all of the copolymerized units in the final copolymer are salt groups.

The metallic compounds which are used to neutralize the carboxyl groups of the copolymers and thus convert them into salt groups are those of divalent and trivalent metals. Actually, only two valences of the trivalent metals may be involved in the neutralization so that the compounds of trivalent metals may react, as far as this invention is concerned, as if they were compounds of divalent metals. Therefore, what is required is that the copolymer be reacted with and neutralized by at least 1.5 moles—and preferably from 2 moles to 3 moles—of the basic metallic compound for every hundred moles of copolymerized ester and acid.

The dispersions are applied by conventional methods such as spraying, dipping and roller-coating and it is recommended that the dispersions be applied in such an amount as to deposit from about two to about six pounds of dry resin film per thousand square feet of coated surface. The dispersions can be applied while the paper is on the paper-making machine or after it has been removed from the machine. Since the water of the dispersions must be removed, it is recommended that the dispersions be applied at the highest solids-content which permits easy application. Dispersions containing 40–50% solids have been used successfully.

The coated paper product is next dried at least to the point where the moisture-content of the paper material is about 12% and the moisture-content of the resinous film is below about 20%. Actually the coated product is "dried" and the word "dried" is used here as in the paper industry in the customary sense to indicate that the coated product is dry to the touch even though it may contain as much as 12% or even somewhat more occluded water. The coated product can be air-dried, as by festooning, or can be force-dried, as by passage through a drying-oven or drying-tunnel. The maximum temperature of drying varies with the kind of paper product but it is obviously below the scorching temperature of the product. Temperatures as high as 220° F. have been employed, as for example in one instance, where coated paper traveling at 200 ft./min. was satisfactorily dried by passage through a 200-foot tunnel maintained at 220° F.

After being coated in this manner, the paper products can be rolled, stacked or bundled under reasonable and conventional conditions without danger of blocking or of sticking together. Any tendency to block increases with temperature or with the moisture-content of the paper product but no blocking has been observed when coated chip board, containing 8% moisture, was held for twenty-four hours under a pressure corresponding to a pile of board six feet high.

The term "paper products" is used herein to indicate paper, cardboard, corrugated board, chip board, and the like, together with shaped articles and containers made therefrom. Thus, the term is used for the sake of convenience and clarity to include wrapping paper, food wrappers, and paper bags, cardboard and folding boxes made therefrom, corrugated board and boxes and containers made therefrom, cardboard plates, containers and the like.

The coated paper products of this invention are characterized by being extremely resistant to oils, fats and greases. They do not absorb oils, fats and greases from foods with which they are brought in contact and consequently are most suitable in places where glassine paper or glassine laminates have been required heretofore. An advantage of the coated products of this invention is that they may be creased or folded without losing their resistance to greases, fats and oils at the creases or folds.

The following example, in which all parts are by weight, serves to illustrate a mode of preparation and the properties of the paper products of this invention.

*Example*

A. The following components were placed in a reactor equipped with a mechanical stirrer and thermometer:

320 parts ethyl acrylate
29.5 parts methyl methacrylate
18.4 parts methacrylic acid
914 parts water
31.6 parts non-ionic dispersing agent (a 70% aqueous solution of a tert.-octylphenoxyethoxyethanol).

To this stirred mixture at 15° was added 0.5 part of ammonium persulfate and 0.5 part of sodium hydrosulfite.

An exothermic polymerization reaction soon took place as evidenced by a rise in temperature to 67° C. over a period of about 20 minutes. Cooling water was circulated and the temperature of the prepared emulsion slowly fell to room temperature. A separate mixture was made of:

393 parts ethyl acrylate
36 parts methyl methacrylate
22.6 parts methacrylic acid
181 parts water
31.7 parts non-ionic dispersing agent (supra).

This mixture was added to the dispersion prepared above and the entire mass was thoroughly agitated. Next 0.5 part of ammonium persulfate and 0.7 part of sodium hydrosulfite were added and again an exothermic polymerization reaction took place. The temperature was maintained below 60° C. by means of cooling water and slowly fell to room temperature.

The resultant dispersion had a resin solids-content of approximately 43%.

B. Twelve equal portions of the dispersion each weighing 100 parts were treated and neutralized with the following basic compounds in the indicated amounts which are approximately equivalent to one and one-half times the amount of copolymerized methacrylic acid in the portions of dispersion: 0.72 part $Al(OH)_3$; 1.46 parts $Al(OOCCH_3)_2OH$; 171 parts $Al(OOCCH_3)_2(OOCH)$; 1.55 parts $Ba(OH)_2$; 0.67 part $Ca(OH)_2$; 0.88 part $Cu(OH)_2$; 1.27 parts $Mg(OOCCH_3)_2$; 0.52 part $Mg(OH)_2$; 2 parts $PbO$; 2.91 parts $Pb(OOCCH_3)_2$; 1.76 parts $ZrO(OOCH)_2$; and 0.9 part $Zn(OH)_2$. After two hours the dispersions were filtered.

C. Pieces of 20 mil chip board (bakery board coated on one side) were roller-coated on the chip side with the dispersions containing the ionic cross-linkers so as to provide a coating of 2–3 pounds of dispersion solids per thousand square feet of chip board. Pieces of kraft bag paper were coated in the same way. The coatings dried rapidly in the air and on drying were continuous and glossy. They were tested for grease-resistance and blocking.

The grease-resistance test which is standard in the paper industry (TAPPI T 454m) was employed. Briefly it comprised making a five-gram pile, one inch in diameter, of standard Ottawa No. 1 sand, on the coated paper product, applying 1.1 cc. of dyed turpentine to the pile and noting the time required for the dyed turpentine to penetrate through the board or paper. Failure of the dyed turpentine to penetrate in thirty minutes is accepted as indicating that the coated paper or board is so grease-resistant as to be suitable for enclosing greasy foods or other oily materials such as oiled rope, for example.

All of the coated pieces of chip board and paper passed this test successfully and—what is of greater significance and importance—they passed the test when the dyed turpentine was applied to a fold or crease previously made in the board or paper.

The coated sheets were also tested for blocking or sticking tendency. This test (TAPPI T 477m) consisted of applying a weight of 2 lbs./sq. in. to a pile of coated pieces and heating the piles under pressure for 24 hours at various temperatures. Under these conditions, the coated chip board and paper did not block or stick at temperatures up to 180° F. when the moisture content was 12% or up to 210° F. when the moisture content was 8%.

It is possible to vary the physical properties, such as hardness and toughness, of the paper coatings by choosing different monomeric esters or combinations of monomeric esters for copolymerization with the acids within the limits set forth above. The products which are made from the esters of methacrylic acid are harder than those made from the corresponding esters of acrylic acid. The hardness of the paper coating is also inversely proportional to the size of the alkyl groups in the esters and is greatest in the case of the methyl esters and least in the case of the butyl esters. Thus methyl methacrylate provides the hardest films while ethyl methacrylate provides the next hardest. Because the products from these two esters alone are so hard, it is recommended that the two esters be used in conjunction with the softer esters, as in the above example, and that a maximum of 50% methyl methacrylate and 70% ethyl methacrylate, on a molar basis, be employed in forming the emulsified copolymers. For example, a good paper coating is that one made from an ionically cross-linked copolymer containing about 40% methyl methacrylate, about 55% butyl acrylate and about 5% methacrylic acid.

The dispersions which have been most satisfactory as regards cost, ease of manufacture, and paper-coating properties and which are preferred consequently are those containing copolymers of the following approximate compositions: 80–90% ethyl acrylate, 16–4% methyl methacrylate and 4–6% acrylic or methacrylic acid, all on a molar basis.

While dispersions which are cross-linked by all of the metals mentioned above provide grease-resistant coatings on paper products, the ones which are cross-linked by calcium or aluminum are preferred because of the ease and efficiency with which they are prepared and utilized.

Currently the greatest interest is in clear coatings; but it is within the scope of this invention to include pigments, dyes, and inert extenders in order to provide opaque, translucent or transparent colored coatings, including white coatings.

We claim:

1. A process for preparing coated paper products which are characterized by being grease-resistant which comprises applying to said paper products a thin layer of an aqueous dispersion of a resinous copolymer and drying said layer; said dispersion being applied in an amount to deposit from about 2 to about 6 pounds of said resinous copolymer per thousand square feet of area of said paper product; and said dispersion being the product of emulsifying with a non-ionic emulsifying agent and copolymerizing a mixture containing 93 to 97 molar percent of at least one member of the class consisting of the methyl, ethyl, propyl and butyl esters of acrylic and methacrylic acids and 3 to 7 molar percent of at least one member of the class consisting of acrylic, methacrylic and itaconic acids, and reacting the resultant emulsified copolymer with a basic metallic compound which is a member of the class consisting of the oxides, hydroxides and basic salts of polyvalent metals, the number of moles of said basic compound which is reacted being from 1.5 to 3.5 percent of the total number of moles of said copolymerized ester and acid.

2. A process for preparing coated paper products which are characterized by being grease-resistant which comprises applying to said paper products a thin layer of an aqueous dispersion of a resinous copolymer and drying said layer; said dispersion being applied in an amount to deposit from about 2 to about 6 pounds of said resinous copolymer per thousand square feet of area of said paper products; and said dispersion being the product of emulsifying with a non-ionic emulsifying agent and copolymerizing a mixture containing 94 to 96 molar percent of at least one member of the class consisting of the methyl, ethyl, propyl and butyl esters of acrylic and methacrylic acids and 4 to 6 molar percent of at least one member of the class consisting of acrylic, methacrylic and itaconic acids, and reacting the resultant dispersed copolymer with a basic metallic compound which is a member of the class consisting of the oxides, hydroxides and basic salts of polyvalent metals, the number of moles of said basic compound which is reacted being from 2 to 3 percent of the total number of moles of said copolymerized ester and acid.

3. The process of claim 2 in which the paper product is a food wrapper.

4. The process of claim 2 in which the paper product is bag paper.

5. The process of claim 2 in which the paper product is chip board.

6. A process for preparing coated paper products which are characterized by being grease-resistant which comprises applying to said paper products a thin layer of an aqueous dispersion of a resinous copolymer and drying said layer; said dispersion being applied in an amount to deposit from about 2 to about 6 pounds of said resinous copolymer per thousand square feet of area of said paper product; and said dispersion being the product of emulsifying with a non-ionic emulsifying agent and copolymerizing a mixture containing 80 to 90 molar percent of ethyl acrylate, 4 to 16 molar percent of methyl methacrylate and 4 to 6 molar percent of methacrylic acid and reacting the resultant dispersed copolymer with a basic metallic compound which is a member of the class consisting of the oxides, hydroxides and basic salts of polyvalent metals, the number of moles of said basic compound which is reacted being from 2 to 3 percent of the total number of moles of said copolymerized esters and acid.

7. As a new article of manufacture, a grease-resistant paper product comprising a paper product base having deposited on at least one surface thereof a coating comprising emulsifying material consisting exclusively of non-ionic type and a cross-linked polyvalent metal salt of a copolymer of 93 to 97 molar percent of at least one member of the class consisting of the methyl, ethyl, propyl, and butyl esters of acrylic and methacrylic acids and 3 to 7 molar percent of at least one member of the class consisting of acrylic, methacrylic and itaconic acids, the copolymer being cross-linked through the polyvalent metal and thereby having a substantially tack-free, non-blocking coating surface.

8. An article as defined in claim 7 in which the polyvalent metal is present in an amount of 1.5 to 3.5 percent of the total number of moles of the copolymerized ester and acid.

9. An article as defined in claim 7 in which the paper product is a food wrapper.

10. An article as defined in claim 7 in which the paper product is bag paper.

11. An article as defined in claim 7 in which the paper product is chipboard.

12. An article as defined in claim 7 in which the polyvalent metal is aluminum.

13. An article as defined in claim 7 in which the polyvalent metal is calcium.

14. As a new article of manufacture, a grease-resistant paper product comprising a paper product base having deposited on at least one surface thereof a coating comprising emulsifying material consisting exclusively of non-ionic type and a cross-linked polyvalent metal salt of a copolymer of 80 to 90 molar percent of ethyl acrylate, 4 to 16 molar percent of methyl methacrylate and 4 to 6 molar percent of methacrylic acid, the copolymer being cross-linked through the polyvalent metal and thereby having a substantially tack-free, non-blocking coating surface.

15. An article as defined in claim 14 in which about 2 to about 6 pounds of the copolymer is deposited per thousand square feet of coated area of the paper product base and the polyvalent metal is present in an amount of 1.5 to 3.5 percent of the total number of moles of the copolymerized ester and acid.

16. An article as defined in claim 15 in which the metal is aluminum.

17. An article as defined in claim 15 in which the metal is calcium.

18. As a new article of manufacture, a grease-resistant paper product comprising a paper product base having deposited on at least one surface thereof a coating comprising emulsifying material consisting exclusively of non-ionic type and a cross-linked polyvalent metal salt of a copolymer of 93 to 97 molar percent of at least one member of the class consisting of the methyl, ethyl, propyl, and butyl esters of acrylic and methacrylic acids and 3 to 7 molar percent of at least one member of the class consisting of acrylic, methacrylic, and itaconic acids, the copolymer being cross-linked through the polyvalent metal and thereby having a substantially tack-free, non-blocking coating surface, about 2 to about 6 pounds of the copolymer being deposited per thousand square feet of coated area of the paper product base and the polyvalent metal being present in an amount of 1.5 to 3.5 percent of the total number of moles of the copolymerized ester and acid.

19. An article as defined in claim 18 in which the metal is aluminum.

20. An article as defined in claim 18 in which the metal is calcium.

References Cited in the file of this patent

UNITED STATES PATENTS

| | | |
|---|---|---|
| 2,343,095 | Smith | Feb. 29, 1944 |

FOREIGN PATENTS

| | | |
|---|---|---|
| 580,250 | Great Britain | of 1946 |

OTHER REFERENCES

Ser. No. 397,138, Fikentscher (A. P. C.), published May 11, 1943.